(12) United States Patent
Kawasaki

(10) Patent No.: US 12,529,734 B2
(45) Date of Patent: Jan. 20, 2026

(54) ELECTROMAGNETIC FIELD ANALYSIS METHOD, ELECTROMAGNETIC FIELD ANALYSIS APPARATUS, AND STORAGE MEDIUM

(71) Applicant: SUMITOMO ELECTRIC INDUSTRIES, LTD., Osaka (JP)

(72) Inventor: Takeshi Kawasaki, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 216 days.

(21) Appl. No.: 18/481,756

(22) Filed: Oct. 5, 2023

(65) Prior Publication Data

US 2024/0118353 A1 Apr. 11, 2024

(30) Foreign Application Priority Data

Oct. 7, 2022 (JP) .................................. 2022-162609

(51) Int. Cl.
*G01R 33/02* (2006.01)

(52) U.S. Cl.
CPC .................................... *G01R 33/02* (2013.01)

(58) Field of Classification Search
CPC .............................. G01R 33/02; G01R 27/00
USPC ......................................... 324/95, 244, 630
See application file for complete search history.

(56) References Cited

U.S. PATENT DOCUMENTS

| | | | | |
|---|---|---|---|---|
| 6,226,599 | B1 * | 5/2001 | Namiki | G01R 29/0892 702/65 |
| 2003/0093767 | A1 * | 5/2003 | Murai | G03F 1/78 430/30 |
| 2008/0079443 | A1 * | 4/2008 | Nishino | G06F 30/367 324/630 |
| 2016/0350467 | A1 * | 12/2016 | Zhao | G06F 30/392 |

FOREIGN PATENT DOCUMENTS

JP 2007-249642 A 9/2007

\* cited by examiner

*Primary Examiner* — Roberto Velez
(74) *Attorney, Agent, or Firm* — Volpe Koenig

(57) ABSTRACT

An electromagnetic field analysis method includes generating meshes so that a first mesh is generated in a first region and no mesh or a second mesh is generated in a second region other than the first region in a coplanar waveguide, the coplanar waveguide including a dielectric layer and a conductor pattern having a signal line and reference potential patterns, the first region including the signal line and respective parts of the reference potential patterns and having a constant width in a direction orthogonal to an extending direction of the signal line, the reference potential patterns being spaced away from the signal line and interposing the signal line therebetween, the second mesh having a larger dimension than the first mesh, and performing electromagnetic field analysis on the coplanar waveguide using the meshes.

19 Claims, 15 Drawing Sheets

ELECTROMAGNETIC FIELD ANALYSIS METHOD, ELECTROMAGNETIC FIELD ANALYSIS APPARATUS, AND STORAGE MEDIUM

CROSS REFERENCE TO RELATED APPLICATIONS

This application claims priority based on Japanese Patent Application No. 2022-162609 filed on Oct. 7, 2022, and the entire contents of the Japanese patent applications are incorporated herein by reference.

FIELD

The present disclosure relates to an electromagnetic field analysis method, an electromagnetic field analysis apparatus, and a storage medium.

BACKGROUND

A coplanar waveguide is used as a transmission line for high-frequency signals. Electromagnetic field analysis using a computer is known (for example, Patent Document 1: Japanese Patent Application Laid-Open No. 2007-249642).

SUMMARY

According to an embodiment of the present disclosure, there is provided an electromagnetic field analysis method including: generating meshes so that a first mesh is generated in a first region and no mesh or a second mesh is generated in a second region other than the first region in a coplanar waveguide, the coplanar waveguide including a dielectric layer and a conductor pattern having a signal line and reference potential patterns, the first region including the signal line and respective parts of the reference potential patterns and having a constant width in a direction orthogonal to an extending direction of the signal line, the reference potential patterns being spaced away from the signal line and interposing the signal line therebetween, the second mesh having a larger dimension than the first mesh; and performing electromagnetic field analysis on the coplanar waveguide using the meshes.

According to an embodiment of the present disclosure, there is provided an electromagnetic field analysis apparatus including a processor configured to: generate meshes so that a first mesh is generated in a first region and no mesh or a second mesh is generated in a second region other than the first region in a coplanar waveguide, the coplanar waveguide including a dielectric layer and a conductor pattern having a signal line and reference potential patterns, the first region including the signal line and respective parts of the reference potential patterns and having a constant width in a direction orthogonal to an extending direction of the signal line, the reference potential patterns being spaced away from the signal line and interposing the signal line therebetween, the second mesh having a larger dimension than the first mesh; and perform electromagnetic field analysis on the coplanar waveguide using the meshes.

An embodiment of the present disclosure is a non-transitory computer-readable storage medium storing an electromagnetic field analysis program causing a computer to execute a process, the process including: generating meshes so that a first mesh is generated in a first region and no mesh or a second mesh is generated in a second region other than the first region in a coplanar waveguide, the coplanar waveguide including a dielectric layer and a conductor pattern having a signal line and reference potential patterns, the first region including the signal line and respective parts of the reference potential patterns and having a constant width in a direction orthogonal to an extending direction of the signal line, the reference potential patterns being spaced away from the signal line and interposing the signal line therebetween, the second mesh having a larger dimension than the first mesh; and performing electromagnetic field analysis on the coplanar waveguide using the meshes.

The present disclosure can be realized as a semiconductor integrated circuit that realizes a part or all of the electromagnetic field analysis apparatus, or can be realized as an electromagnetic field analysis system including the electromagnetic field analysis apparatus.

DETAILED DESCRIPTION OF EMBODIMENTS

Figure 1:
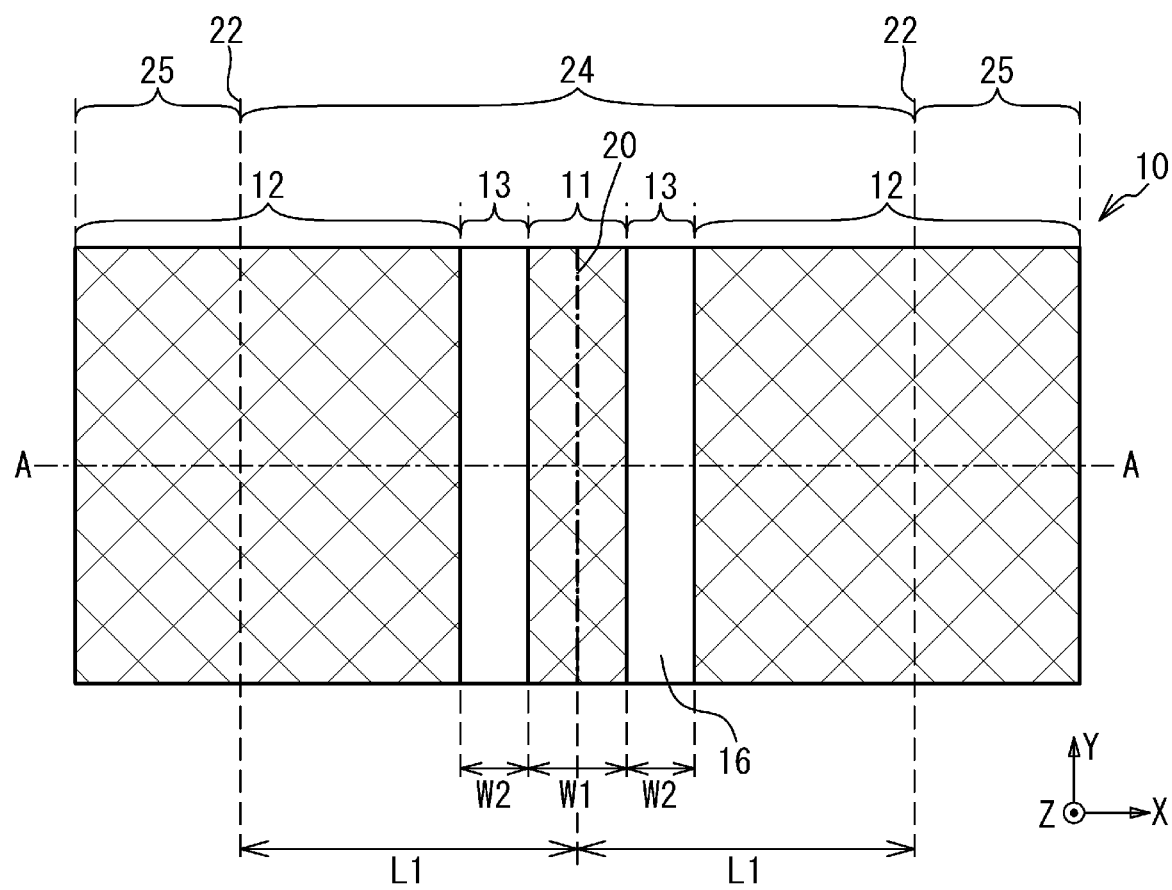
FIG. 1 is a plan view of a coplanar waveguide.

The high-frequency characteristics of the coplanar waveguide may be calculated using an electromagnetic field analysis method. In this case, efficient electromagnetic field analysis is desired.

An object of the present disclosure is to efficiently perform electromagnetic field analysis of a coplanar waveguide.

DESCRIPTION OF EMBODIMENTS OF THE PRESENT DISCLOSURE

First, the contents of the embodiments of this disclosure are listed and described.

(1) An embodiment of the present disclosure is an electromagnetic field analysis method including: generating meshes so that a first mesh is generated in a first region and no mesh or a second mesh is generated in a second region other than the first region in a coplanar waveguide, the coplanar waveguide including a dielectric layer and a conductor pattern having a signal line and reference potential patterns, the first region including the signal line and respective parts of the reference potential patterns and having a constant width in a direction orthogonal to an extending direction of the signal line, the reference potential patterns being spaced away from the signal line and interposing the signal line therebetween, the second mesh having a larger dimension than the first mesh; and performing electromagnetic field analysis on the coplanar waveguide using the meshes. Thereby, efficient electromagnetic field analysis is achieved.

(2) In the above (1), the generating of the meshes may include generating the first mesh on a surface of the conductor pattern in the first region and generating no mesh in the second region, and the performing of the electromagnetic field analysis may include performing the electromagnetic field analysis using a boundary element method.

(3) In the above (2), the generating of the meshes may include generating no mesh in the dielectric layer.

(4) In the above (1), the generating of the meshes may include generating the first mesh in the conductor pattern and the dielectric layer in the first region and generating the second mesh in the conductor pattern and the dielectric layer in the second region, and the performing of the electromagnetic field analysis may include performing the electromagnetic field analysis using a finite element method.

(5) In any one of the above (1) to (4), the generating of the meshes may include setting a region within a certain distance from a center line of the signal line in a direction orthogonal to an extending direction of the center line as the first region, and setting a region away from the center line by a distance greater than the certain distance in the direction orthogonal to the center line as the second region.

(6) In the above (5), the constant distance may be $A \times W1 + B \times W2$, where $W1$ is a width of the signal line in the direction orthogonal to the extending direction, $W2$ is a distance between the signal line and each of the reference potential patterns in the direction orthogonal to the extending direction, A is a constant, and B is a constant.

(7) In the above (6), A may be a constant of 0.5 or greater and 2.5 or less, and B may be a constant of 1 or greater and 5 or less.

(8) In any one of the above (1) to (4), the signal line may include a first signal line, a second signal line, and a third signal line connected to each other at one point, the generating of the meshes may include setting, as the first region, a region where a region within a first distance from a first center line of the first signal line in a first direction orthogonal to an extending direction of the first center line, a region within a second distance from a second center line of the second signal line in a second direction orthogonal to an extending direction of the second center line, and a region within a third distance from a third center line of the third signal line in a third direction orthogonal to an extending direction of the third center line overlap each other, the first distance may be $A \times W1a + B \times W2a$, the second distance may be $A \times W1b + B \times W2b$, and the third distance may be $A \times W1c + B \times W2c$ where $W1a$ represents a width of the first signal line in the first direction, $W2a$ represents a distance between the first signal line and each of first patterns of the reference potential patterns in the first direction, $W1b$ represents a width of the second signal line in the second direction, $W2b$ represents a distance between the second signal line and each of second patterns of the reference potential patterns in the second direction, $W1c$ represents a width of the third signal line in the third direction, $W2c$ represents a distance between the third signal line and each of third patterns of the reference potential patterns in the third direction, A is a constant, and B is a constant.

(9) In any one of the above (1) to (4), the signal line may include a first signal line and a second signal line, the second signal line having a first end connected to the first signal line and a second end that is open, the generating of the meshes may include setting, as the first region, a region where a region within a first distance from a first center line of the first signal line in a first direction orthogonal to an extending direction of the first center line and a region within a third distance from a line in a second direction orthogonal to an extending direction of the line overlap each other, the line being obtained by extending a second center line of the second signal line from the second end of the second signal line by a second distance, and the first distance may be $A \times W1a + B \times W2a$, the second distance may be $A \times W1b + B \times W2b - W1b/2$, and the third distance may be $A \times W1b + B \times W2b$ where $W1a$ represents a width of the first signal line in the first direction, $W2a$ represents a distance between the first signal line and each of first patterns of the reference potential patterns in the first direction, $W1b$ represents a width of the second signal line in the second direction, $W2b$ represents a distance between the second signal line and each of second patterns of the reference potential patterns in the second direction, A is a constant, and B is a constant.

(10) An embodiment of the present disclosure is an electromagnetic field analysis apparatus including: a processor configured to: generate meshes so that a first mesh is generated in a first region and no mesh or a second mesh is generated in a second region other than the first region in a coplanar waveguide, the coplanar waveguide including a dielectric layer and a conductor pattern having a signal line and reference potential patterns, the first region including the signal line and respective parts of the reference potential patterns and having a constant width in a direction orthogonal to an extending direction of the signal line, the reference potential patterns being spaced away from the signal line and interposing the signal line therebetween, the second mesh having a larger dimension than the first mesh; and perform electromagnetic field analysis on the coplanar waveguide using the meshes.

(11) In the above (10), the processor may be configured to: generate the first mesh on a surface of the conductor pattern in the first region and generate no mesh in the second region when generating the meshes, and perform the electromagnetic field analysis using a boundary element method when performing the electromagnetic field analysis.

(12) In the above (11), the processor may be configured to generate no mesh in the dielectric layer when generating the meshes.

(13) In any one of the above (10) to (13), the processor may be configured to: generate the first mesh in the conductor pattern and the dielectric layer in the first region and generate the second mesh in the conductor pattern and the dielectric layer in the second region when generating the meshes, and perform the electromagnetic field analysis using a finite element method when performing the electromagnetic field analysis.

(14) In any one of the above (10) to (13), the processor may be configured to set a region within a certain distance from a center line of the signal line in a direction orthogonal to an extending direction of the center line as the first region, and set a region away from the center line by a distance greater than the certain distance in the direction orthogonal to the center line as the second region when generating the meshes.

(15) In the above (14), the certain distance may be $A \times W1 + B \times W2$, where W1 is a width of the signal line in the direction orthogonal to the extending direction, W2 is a distance between the signal line and each of the reference potential patterns in the direction orthogonal to the extending direction, A is a constant, and B is a constant.

(16) In the above (15), A may be a constant of 0.5 or greater and 2.5 or less, and B may be a constant of 1 or greater and 5 or less.

(17) In any one of the above (10) to (13), the signal line may include a first signal line, a second signal line, and a third signal line connected to each other at one point, the processor may be configured to set, as the first region, a region where a region within a first distance from a first center line of the first signal line in a first direction orthogonal to an extending direction of the first center line, a region within a second distance from a second center line of the second signal line in a second direction orthogonal to an extending direction of the second center line, and a region within a third distance from a third center line of the third signal line in a third direction orthogonal to an extending direction of the third center line overlap each other when generating the meshes, and the first distance may be $A \times W1a + B \times W2a$, the second distance may be $A \times W1b + B \times W2b$, and the third distance may be $A \times W1c + B \times W2c$ where W1a represents a width of the first signal line in the first direction, W2a represents a distance between the first signal line and each of first patterns of the reference potential patterns in the first direction, W1b represents a width of the second signal line in the second direction, W2b represents a distance between the second signal line and each of second patterns of the reference potential patterns in the second direction, W1c represents a width of the third signal line in the third direction, W2c represents a distance between the third signal line and each of third patterns of the reference potential patterns in the third direction, A is a constant, and B is a constant.

(18) In any one of the above (10) to (13), the signal line may include a first signal line and a second signal line, the second signal line having a first end connected to the first signal line and a second end that is open, the processor may be configured to set, as the first region, a region where a region within a first distance from a first center line of the first signal line in a first direction orthogonal to an extending direction of the first center line and a region within a third distance from a line in a second direction orthogonal to an extending direction of the line overlap each other when generating the meshes, the line being obtained by extending a second center line of the second signal line from the second end of the second signal line by a second distance, and the first distance may be $A \times W1a + B \times W2a$, the second distance may be $A \times W1b + B \times W2b - W1b/2$, and the third distance may be $A \times W1b + B \times W2b$ where W1a represents a width of the first signal line in the first direction, W2a represents a distance between the first signal line and each of first patterns of the reference potential patterns in the first direction, W1b represents a width of the second signal line in the second direction, W2b represents a distance between the second signal line and each of second patterns of the reference potential patterns in the second direction, A is a constant, and B is a constant.

(19) An embodiment of the present disclosure is a non-transitory computer-readable storage medium storing an electromagnetic field analysis program that causes a computer to execute a process: the process including: generating meshes so that a first mesh is generated in a first region and no mesh or a second mesh is generated in a second region other than the first region in a coplanar waveguide, the coplanar waveguide including a dielectric layer and a conductor pattern having a signal line and reference potential patterns, the first region including the signal line and respective parts of the reference potential patterns and having a constant width in a direction orthogonal to an extending direction of the signal line, the reference potential patterns being spaced away from the signal line and interposing the signal line therebetween, the second mesh having a larger dimension than the first mesh; and performing electromagnetic field analysis on the coplanar waveguide using the meshes.

DETAILS OF EMBODIMENTS OF THE PRESENT DISCLOSURE

Specific examples of an electromagnetic field analysis method, an electromagnetic field analysis apparatus, and a storage medium according to embodiments of the present disclosure will be described below with reference to the drawings. Note that the present disclosure is not limited to these examples, but is defined by the scope of the claims and is intended to include all modifications within the meaning and scope equivalent to the scope of the claims.

At least some of the embodiments described below may be freely combined. The electromagnetic field analysis apparatus is configured to include a computer, and each function of the electromagnetic field analysis apparatus is fulfilled by a computer program stored in a storage device of the computer being executed by a central processing unit (CPU) of the computer. The computer program may be stored in a storage medium such as a CD-ROM (Compact Disc Read Only Memory) or a DVD (Digital Versatile Disc).

First Embodiment

Figure 2:
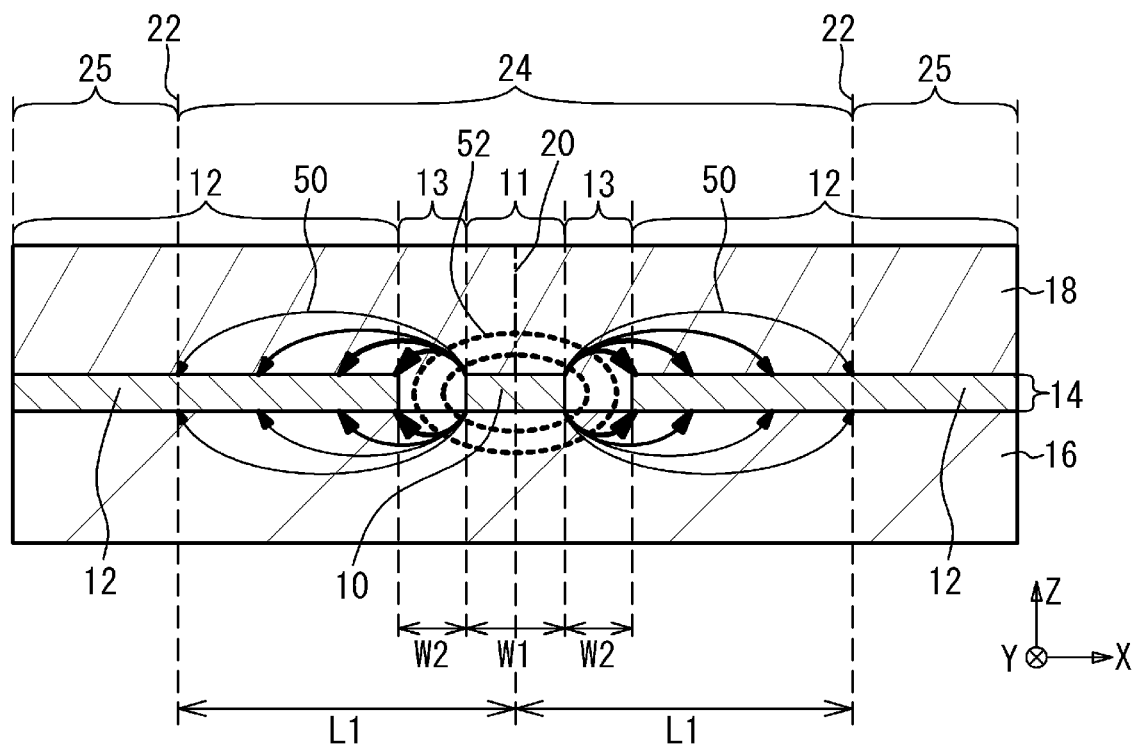
FIG. 2 is a cross-sectional view taken along line A-A in FIG. 1.

First, a coplanar waveguide (CPW) will be described. FIG. 1 is a plan view of a coplanar waveguide. FIG. 2 is a cross-sectional view taken along line A-A in FIG. 1. A stacking direction of a dielectric layer 16, a conductor layer 14, and a dielectric layer 18 is defined as a Z direction, an extending direction of a signal line 11 is defined as a Y direction, and a direction that is a planar direction and is orthogonal to the Y direction is defined as an X direction.

As illustrated in FIG. 1 and FIG. 2, in the coplanar waveguide, the conductor layer 14 is provided on the dielectric layer 16, and the dielectric layer 18 is provided on the conductor layer 14. Either one of the dielectric layers 16 and 18 may be air. The conductor layer 14 forms a conductor pattern 10. The conductor pattern 10 has the signal line 11 and reference potential patterns 12. The signal line 11 is a line through which a high-frequency signal is transmitted. The high-frequency signal is, for example, microwaves or millimeter waves having a frequency of 0.3 GHz or higher. The reference potential patterns 12 are conductor patterns to which a reference potential such as a ground potential is supplied, and are provided to be spaced apart from the signal line 11 in the X direction so as to interpose the signal line 11 therebetween. The region between the signal line 11 and the reference potential pattern 12 is a gap region 13 where the conductor layer 14 is not provided. The characteristic impedance of the coplanar waveguide mainly depends on the width W1 of the signal line 11 in the X direction, the width W2 of the gap region 13 in the X direction, and the dielectric constants of the dielectric layers 16 and 18.

In FIG. 2, arrows 50 directed from the signal line 11 to the reference potential pattern 12 in the dielectric layers 16 and 18 indicate electric fields between the signal line 11 and the reference potential pattern 12. Broken lines 52 surrounding the signal line 11 indicate magnetic fields. A thick arrow among the arrows 50 indicates that the electric field is large, and indicates that the electromagnetic field coupling between the signal line 11 and the reference potential pattern 12 is large. The electromagnetic field coupling between a region of the reference potential pattern 12 close to the signal line 11 and the signal line 11 is large, but the electromagnetic field coupling between a region of the reference potential pattern 12 far from the signal line 11 and the signal line 11 is small. A line connecting points located away from a center line 20 of the signal line 11 by a distance L1 is referred to as a boundary 22. The reference potential pattern 12 located further out than the boundary 22 is hardly electromagnetically coupled with the signal line 11. A region 24 is a region located further in than the boundary 22, and a region 25 is a region located further out than the boundary 22. The distance L1 is, for example, A×W1+B×W2 (A and B are constants). As an example, by setting the distance L1 to 1.5W1+3W2, the electromagnetic field coupling with the signal line 11 is reduced in the region 25.

[Block Diagram of a Computer]

Figure 3:
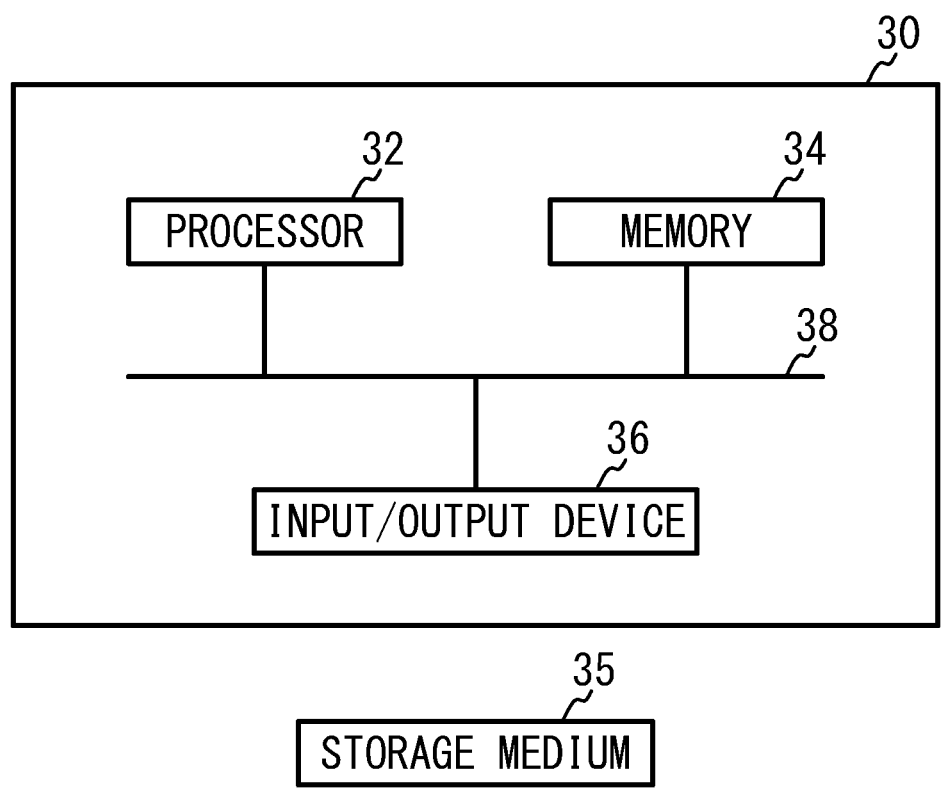
FIG. 3 is a block diagram of a computer in a first embodiment.

FIG. 3 is a block diagram of a computer in the first embodiment. A computer 30 functions as an electromagnetic field analysis apparatus that performs electromagnetic field analysis in cooperation with software. The computer 30 executes an electromagnetic field analysis program for performing electromagnetic field analysis, and executes an electromagnetic field analysis method for performing electromagnetic field analysis.

The computer 30 includes a processor 32, a memory 34, an input/output device 36, and an internal bus 38. The processor 32 is, for example, a CPU, and executes the electromagnetic field analysis program and the electromagnetic field analysis method. The memory 34 is, for example, a volatile memory or a nonvolatile memory, and stores data and the like used when the processor 32 executes the electromagnetic field analysis program and the electromagnetic field analysis method. The memory 34 may store the electromagnetic field analysis program to be executed by the processor 32. The input/output device 36 receives data acquired by the processor 32 from an external device and outputs data output by the processor 32 to the external device. The internal bus 38 connects the processor 32, the memory 34, and the input/output device 36 and transmits data and the like. The electromagnetic field analysis program is stored in a storage medium 35. The storage medium 35 is, for example, a non-transitory tangible medium, such as a CD-ROM or a DVD.

[Flowchart]

Figure 4:
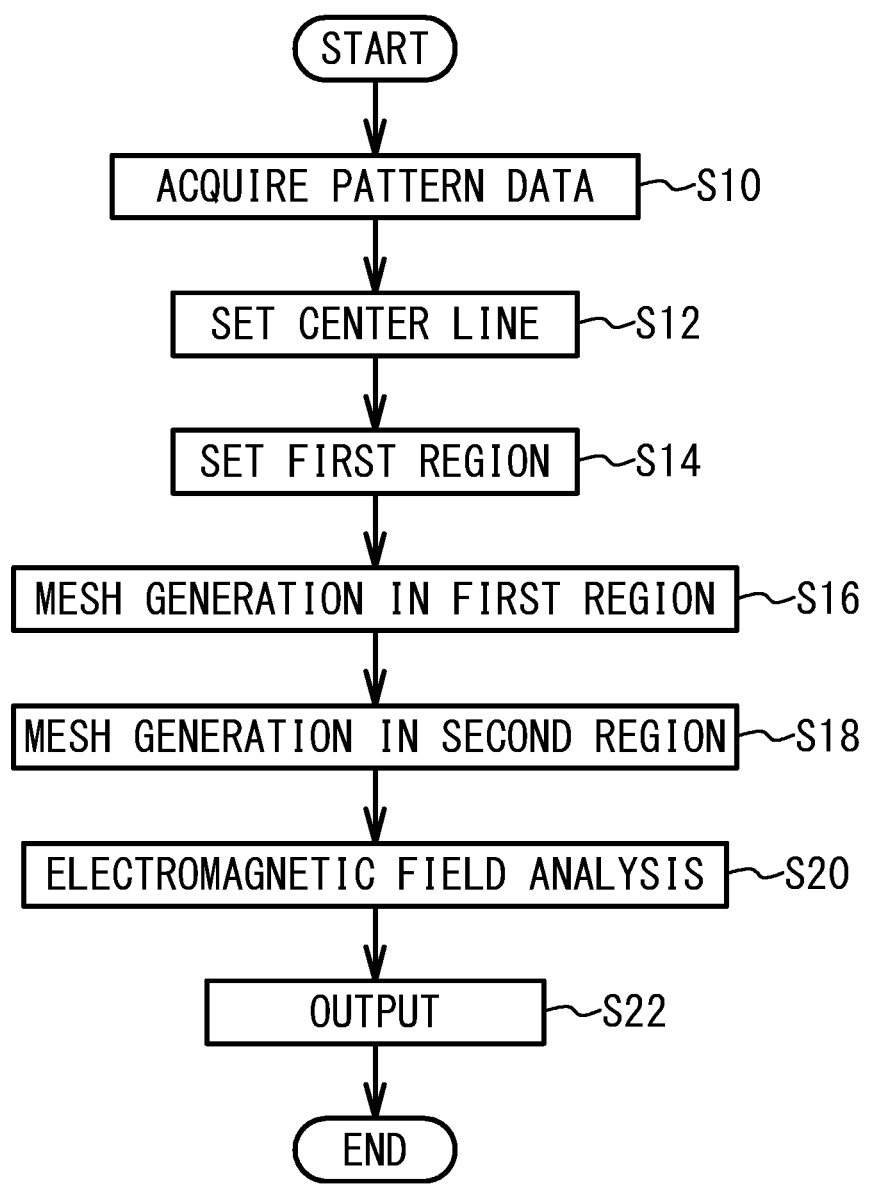
FIG. 4 is a flowchart illustrating an electromagnetic field analysis method in the first embodiment.

FIG. 4 is a flowchart illustrating the electromagnetic field analysis method in the first embodiment. FIG. 5 to FIG. 8 are plan views illustrating an example of a pattern in the first embodiment. As illustrated in FIG. 4, the processor 32 acquires pattern data and the like from an external device via the input/output device 36 (step S10). At this time, the processor 32 acquires, information on the position where the high-frequency signal is input, the position where the high-frequency signal is output, and the position where the reference potential is supplied in the conductor pattern 10. The processor 32 also acquires information such as the dielectric constants and the thicknesses of the dielectric layers 16 and 18.

Figure 5:
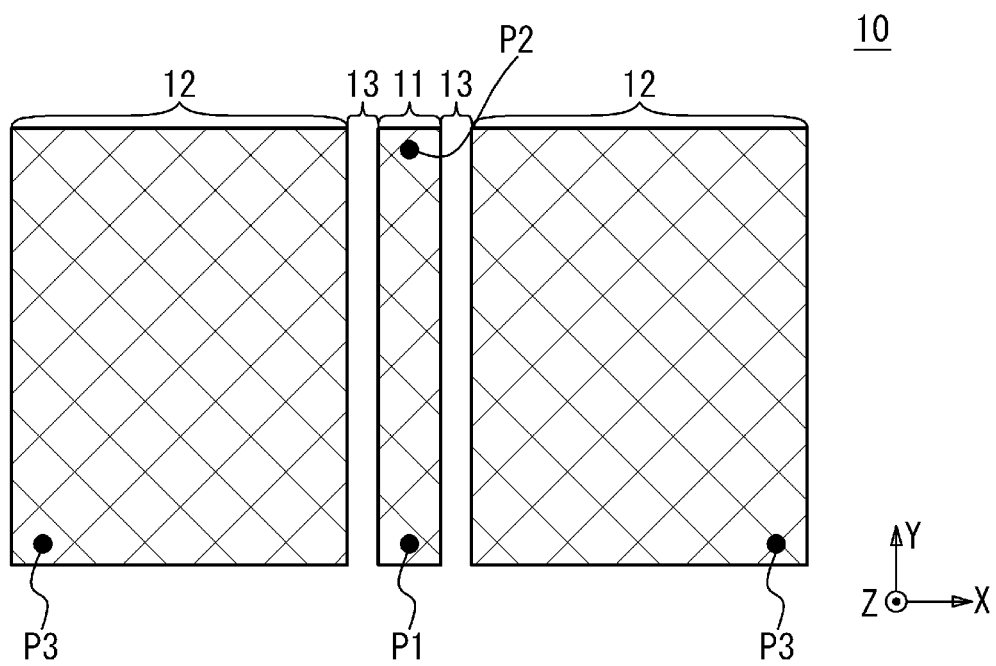
FIG. 5 is a plan view illustrating an example of a pattern in the first embodiment.

As illustrated in FIG. 5, the pattern data is data indicating a region where the conductor pattern 10 is provided, and is represented by a first layer. For example, in the first layer, the numerical value of the coordinate where the conductor pattern 10 is provided is set to 1, and the numerical value of the coordinate where the conductor pattern 10 is not provided is set to 0. The position P1 is a position where the high-frequency signal is input, and the position P2 is a position where the high-frequency signal is output. The position P3 is a position where the reference potential is supplied. The conductor pattern 10 has the signal line 11 and the reference potential patterns 12.

Figure 6:
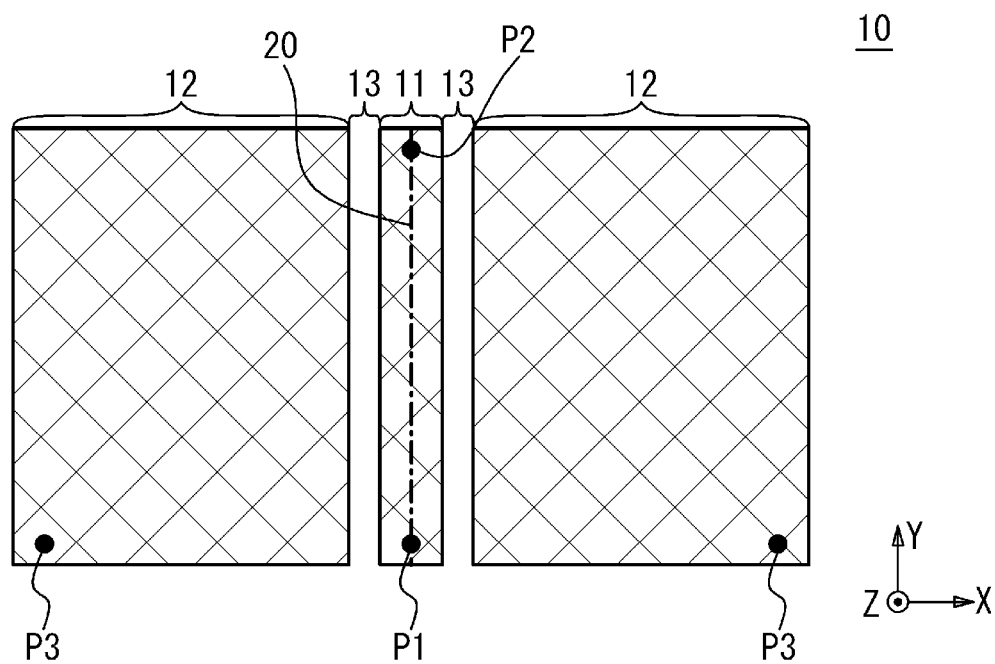
FIG. 6 is a plan view illustrating the example of the pattern in the first embodiment.

Referring back to FIG. 4, the processor 32 sets the center line 20 of the signal line 11 (step S12). As illustrated in FIG. 6, for example, the processor 32 recognizes a pattern in which the positions P1 and P2 are present in the conductor pattern 10 as the signal line 11, and recognizes a pattern in which the position P3 is present as the reference potential pattern 12. The processor 32 sets a line connecting midpoints, in a direction orthogonal to the extending direction of the signal line 11, of the signal line 11 as the center line 20 of the signal line 11. Although an example in which the signal line 11 extends linearly will be described, the signal line 11 may extend in a curved shape. In this case, the center line 20 is a curve.

Figure 7:
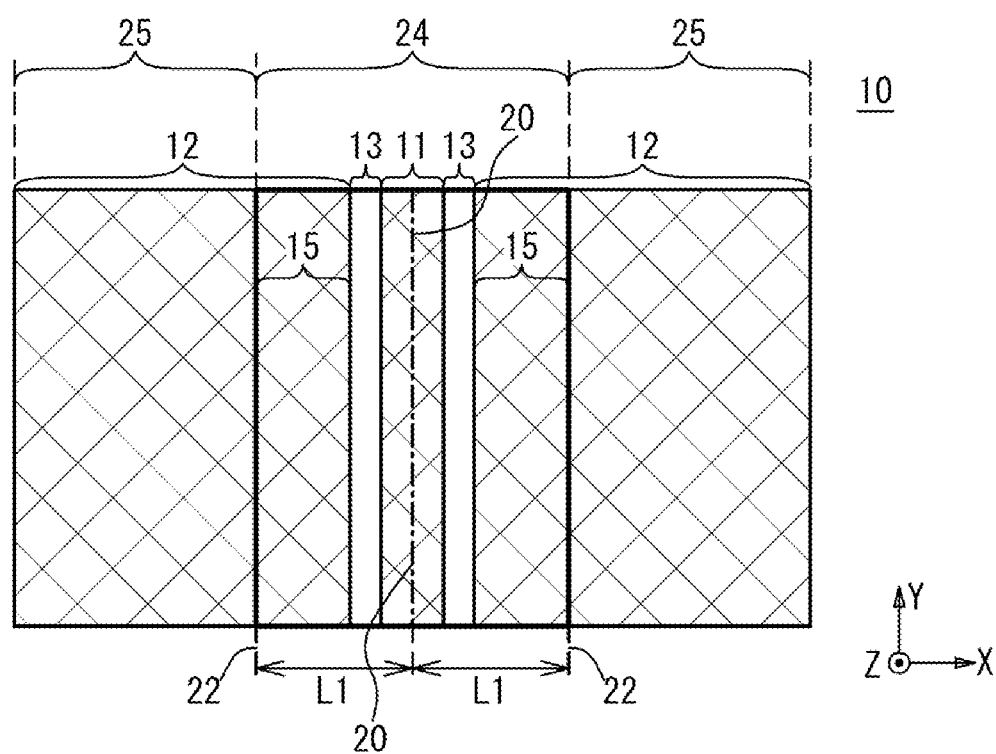
FIG. 7 is a plan view illustrating the example of the pattern in the first embodiment.

Referring back to FIG. 4, the processor 32 sets the first region 24 (step S14). As illustrated in FIG. 7, for example, the processor 32 sets the boundary 22 at the distance L1 from the center line 20 in the X direction (direction orthogonal to the extending direction of the signal line 11). The processor 32 sets a region between the boundaries 22 as the first region 24. The first region 24 includes the signal line 11 and regions 15, which are closer to the signal line 11, of the reference potential patterns 12. For example, the processor 32 expresses the first region 24 by a second layer, and in the second layer, the numerical value of the coordinate of the first region 24 is set to 1 and the numerical value of the coordinate of the second region 25 other than the first region 24 is set to 0.

Figure 8:
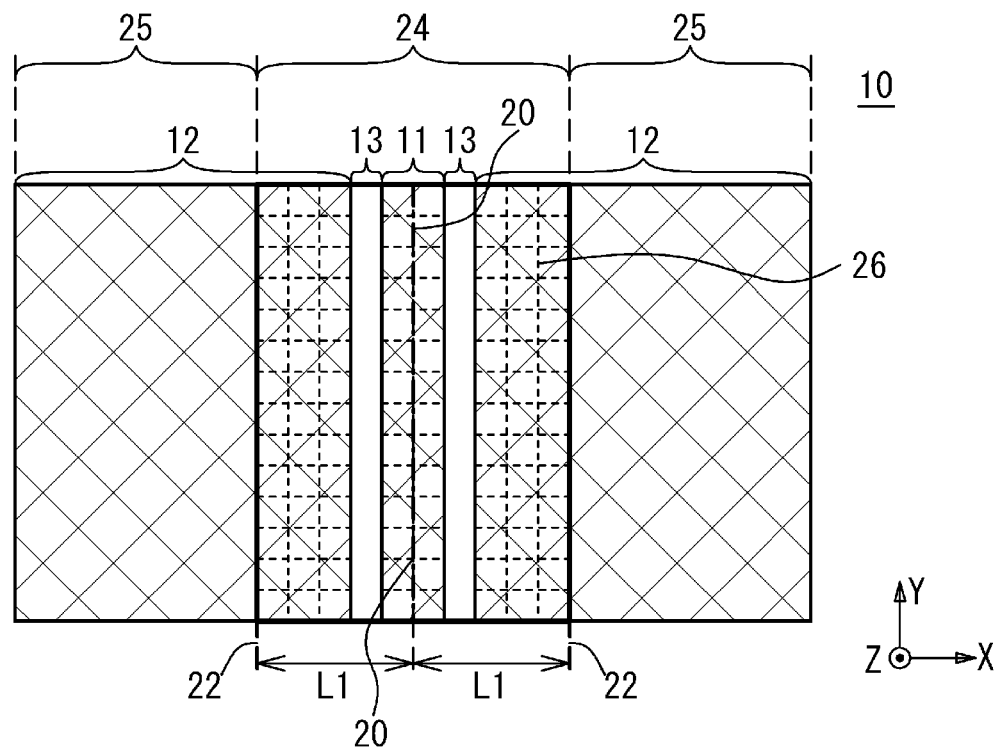
FIG. 8 is a plan view illustrating the example of the pattern in the first embodiment.

Referring back to FIG. 4, the processor 32 generates meshes for electromagnetic field analysis in the first region 24 (step S16). As illustrated in FIG. 8, for example, the processor 32 generates meshes 26 in the conductor pattern 10 within the first region 24. The processor 32 can generate the meshes 26 in the signal line 11 and the regions 15 of the reference potential patterns 12 within the first region 24 by generating the meshes 26 in the region where the first layer is 1 and the second layer is 1, for example. The condition under which the meshes are generated in the first region 24 is a first condition.

Referring back to FIG. 4, the processor 32 generates meshes for electromagnetic field analysis in the second region 25 (step S18). In the example of FIG. 8, the condition under which the processor 32 generates meshes in the second region 25 is a condition under which meshes are not generated. Therefore, no mesh is formed in the second region 25. As described above, the condition under which the meshes are generated in the second region 25 is a second condition, which is different from the first condition.

Referring back to FIG. 4, the processor 32 performs electromagnetic field analysis (step S20). As a method of the electromagnetic field analysis, for example, a discretization analysis method is used. The discretization analysis method is a numerical analysis method that handles small spaces obtained by dividing a space. Examples of the discretization analysis method include a finite element method and a boundary element method. In the electromagnetic field analysis, Maxwell's equations are solved for the electric field and the magnetic field with respect to time in the mesh when a high-frequency signal is input from the input port. Thus, the high-frequency characteristics of the conductor pattern 10 or the characteristics of the pattern are calculated. Examples of the high-frequency characteristic of the conductor pattern 10 include an S parameter or impedance between the input port and the output port of a high-frequency signal. Examples of the characteristics of the pattern include the current and/or voltage in the conductor pattern 10, and the strength of the electric field and/or magnetic field, etc.

The processor 32 outputs the result of the electromagnetic field analysis to the external device via the input/output device 36 (step S22). Thereafter, the process is terminated.

Since the coplanar waveguide is provided with the signal line 11 and the reference potential patterns 12 that are electromagnetically coupled to each other in the same plane, a transmission line can be formed with a simple structure. For example, in a microstrip-line (MSL), a signal line is provided on the upper surface of the dielectric layer, and a reference potential pattern is provided on the entire lower surface of the dielectric layer. Therefore, in order to connect the electronic component on the upper surface of the dielectric layer to the reference potential pattern, a through electrode penetrating through the dielectric layer is provided, which complicates the manufacturing process. In addition, for a high-frequency signal having a high frequency, a parasitic inductance of the through electrode becomes a problem. Therefore, a coplanar waveguide is used in a high-frequency device.

When the electromagnetic field analysis of the microstrip line is performed, if it is assumed that the reference potential pattern is provided on the entire surface, it is not necessary to generate meshes in the reference potential pattern. Therefore, the load of the electromagnetic field analysis is reduced in the microstrip line. On the other hand, in the coplanar waveguide, the signal line 11 and the reference potential patterns 12 are provided in the same plane. Therefore, meshes are generated over the entire reference potential pattern 12. Therefore, in the coplanar waveguide, the number of meshes increases, and the load of the electromagnetic field analysis increases.

In the first embodiment, as illustrated in step S14 of FIG. 4 and FIG. 7, the computer 30 sets the first region 24 that includes the signal line 11 and a part (region 15) of each of the reference potential patterns 12 and has a constant width (2×L1), and sets the region other than the first region 24 as the second region 25, in the coplanar waveguide having the dielectric layers 16 and 18 and the conductor pattern 10. In step S16 of FIG. 4, the computer 30 generates the meshes 26 (first meshes) in the first region 24. In step S18, the computer 30 generates no mesh 26 in the second region 25. The computer 30 may generate second meshes having a larger dimension in the second region 25 than the mesh 26 in the first region 24.

Thereafter, as in step S20, the computer 30 performs the electromagnetic field analysis on the coplanar waveguide using the meshes 26. As illustrated in FIG. 2, the reference potential pattern 12 in the first region 24 has strong electromagnetic coupling with the signal line 11, whereas the reference potential pattern 12 in the second region 25 has weak electromagnetic coupling with the signal line 11. Therefore, no mesh is generated in the second region 25, or meshes having a larger dimension than the mesh in the first region 24 is generated in the second region 25. This configuration reduces the load of the electromagnetic field analysis in the second region 25 having weak electromagnetic field coupling with the signal line 11. Therefore, the electromagnetic field analysis can be efficiently performed.

As illustrated in FIG. 7, the computer 30 sets a region within a certain distance L1 from the center line 20 of the signal line 11 in a direction orthogonal to the extending direction of the center line 20 as the first region 24, and sets a region away from the center line 20 by a distance greater than the certain distance L1 in the direction orthogonal to the center line 20 of the signal line 11 as the second region 25. Thus, a region where the electromagnetic field coupling between the reference potential pattern 12 and the signal line 11 is weak can be set as the second region 25. Therefore, the load of the electromagnetic field analysis can be reduced without reducing the accuracy of the electromagnetic field analysis.

The width of the signal line 11 in the direction orthogonal to the extending direction of the center line 20 is represented by W1, the distance between the signal line 11 and the reference potential pattern 12 (the width of the gap region 13) is represented by W2, A is a constant, and B is a constant. In this case, the predetermined distance L1 is A×W1+B×W2. Thus, by setting the distance L1 using the widths W1 and W2, it is possible to set the second region 25 where the electromagnetic field coupling between the reference potential pattern 12 and the signal line 11 is weak. According to the experience of the inventors, A is, for example, 0.5 or greater and 2.5 or less, or 1 or greater and 2 or less, and is 1.5 as an example. B is, for example, 1 or greater and 5 or less, or 2 or greater and 4 or less, and is 3 as an example.

The computer 30 sets the conductor pattern 10 as the first layer as illustrated in FIG. 5, and sets the first region 24 as the second layer as illustrated in FIG. 7. As illustrated in FIG. 8, the computer 30 generates the meshes 26 in a region where the first layer and the second layer overlap. No mesh is generated in the second region 25 other than the first region 24. This allows meshes to be generated in the conductor pattern 10 in the first region 24.

[Example of Boundary Element Method]

Figure 9:
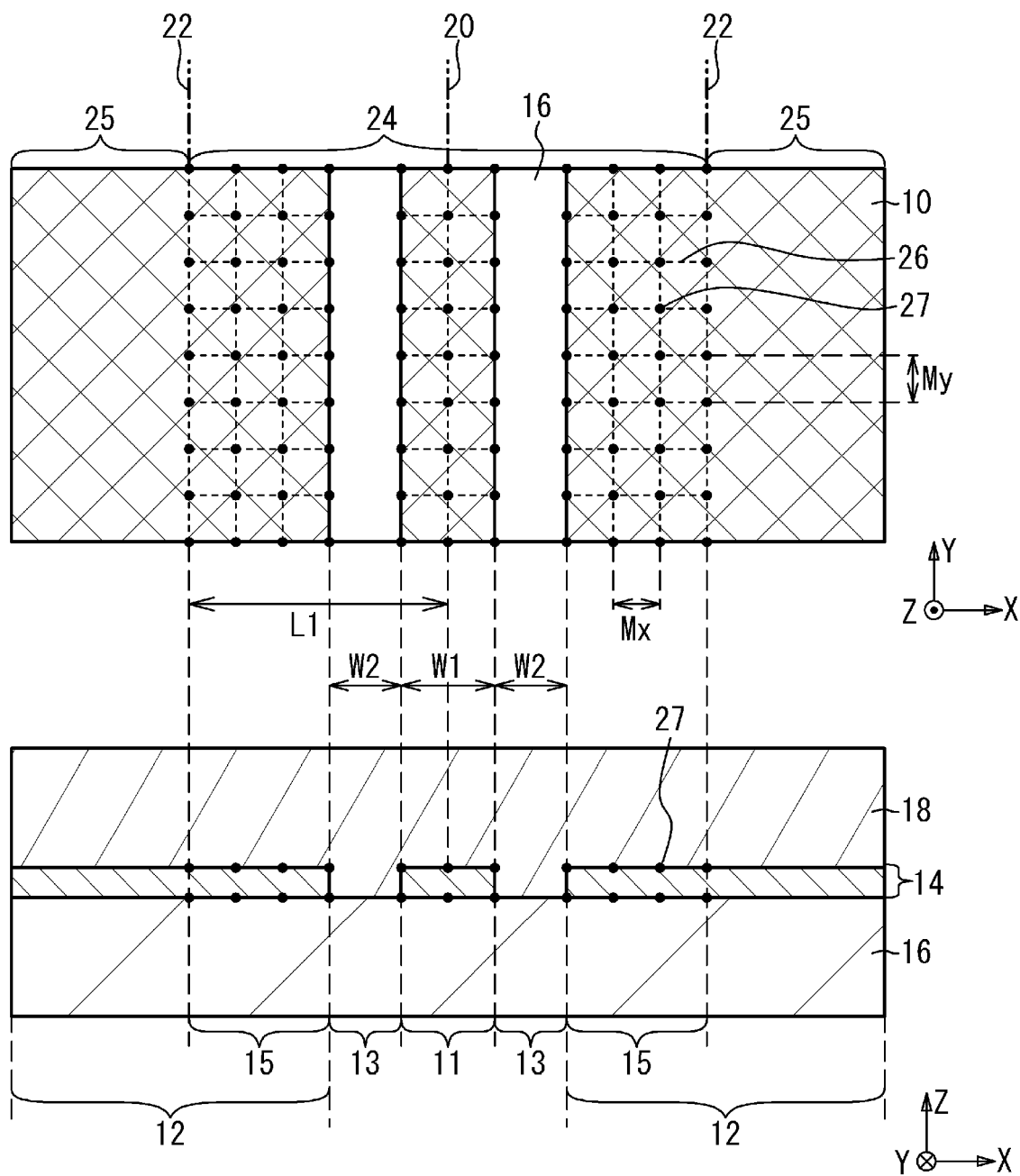
FIG. 9 is a plan view and a cross-sectional view illustrating meshes used in the boundary element method.

A method of generating meshes in steps S16 and S18 when the electromagnetic field analysis is performed using the boundary element method in step S20 will be described. FIG. 9 is a plan view and a cross-sectional view illustrating meshes used in the boundary element method. The plan view illustrates the conductor pattern 10 and the dielectric layer 16. As illustrated in FIG. 9, the conductor pattern 10 in the first region 24 includes the signal line 11 and the region 15 of each of the reference potential patterns 12. As illustrated in the plan view, the meshes 26 are provided in the signal line 11 and the regions 15. The points at which the lines intersect in the meshes 26 are grids 27.

The dimensions of the meshes 26 in the X and Y directions are Mx and My, respectively. The dimensions Mx and My may be the same or different. The mesh 26 in the signal line 11 and the mesh 26 in the region 15 may have the same or different dimensions Mx and may have the same or different dimensions My. For example, the dimensions Mx and My of the mesh 26 are made small in regions where the change in the electric field is large. When the dimensions Mx and My of the mesh 26 are small, the calculation accuracy is improved but the calculation load is increased. When the dimensions Mx and My of the mesh 26 are large, the calculation load is light, but the calculation accuracy decreases. In view of the above, the dimensions Mx and My of the mesh 26 are, for example, ½ to ¹⁄₃₂ times the wavelength of the high-frequency signal, or are, for example, ⅛ to ¹⁄₁₆ times the wavelength of the high-frequency signal. No mesh is generated in the second region 25. In the boundary element method, meshes are generated in the boundary between the conductor pattern 10 and each of the dielectric layers 16 and 18, and numerical values of the electric field or the like on a plane within the mesh 26 is calculated.

In the boundary element method, meshes are generated on the surface of the conductor pattern 10. In the microstrip line, since the reference potential pattern is provided on the entire surface, it is not necessary to generate a mesh in the reference potential pattern, and it is sufficient to generate meshes in the signal line. Therefore, the number of meshes is reduced and the load of the electromagnetic field analysis is reduced. On the other hand, in the coplanar waveguide, if meshes are generated in the entire reference potential pattern 12, the number of meshes increases and the load of the electromagnetic field analysis increases.

Therefore, as illustrated in FIG. 9, when the electromagnetic field analysis is performed using the boundary element method, the computer 30 generates the meshes 26 (first meshes) on the surface of the conductor pattern 10 within the first region 24 and does not generate any mesh in the second region 25 in steps S16 and S18. Thus, the number of meshes generated on the surface of the conductor pattern 10 is reduced, and the load of the electromagnetic field analysis can be reduced.

Further, in the boundary element method, the computer 30 generates no mesh 26 in the dielectric layers 16 and 18 other than the conductor pattern 10, and takes in the information on the dielectric layers 16 and 18 as the dielectric constants and the thicknesses. Thus, the load of the electromagnetic field analysis can be further reduced.

[Example of Finite Element Method]

Figure 10:
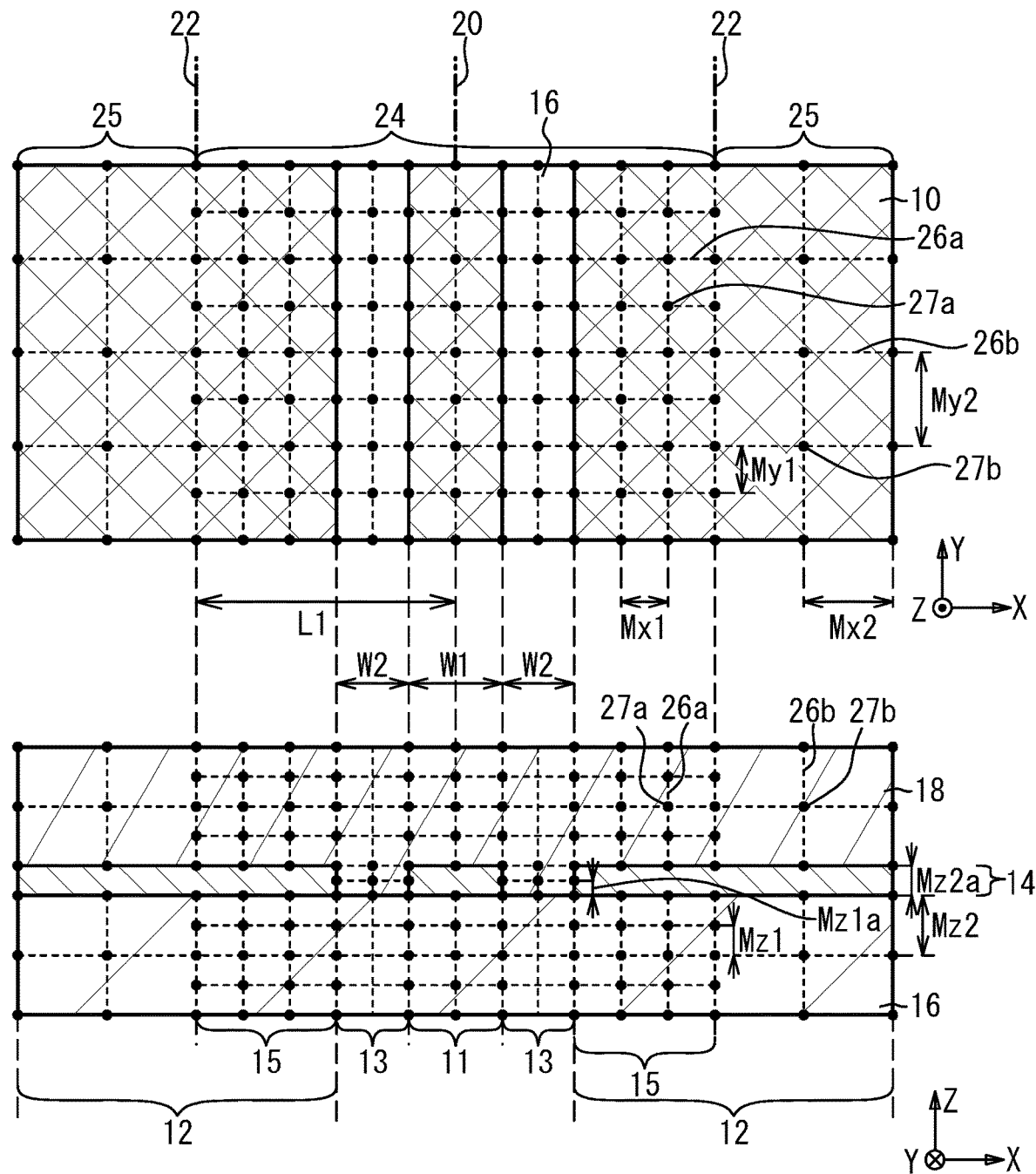
FIG. 10 is a plan view and a cross-sectional view illustrating meshes used in the finite element method.

A method of generating meshes in steps S16 and S18 when the electromagnetic field analysis is performed using a finite element method in step S20 will be described. FIG. 10 is a plan view and a cross-sectional view illustrating meshes used in the finite element method. As illustrated in FIG. 10, the dimensions of a mesh 26a in the X direction and the Y direction in the first region 24 are Mx1 and My1, respectively. The dimensions Mx1 and My1 of the mesh 26a are, for example, ½ to ¹⁄₃₂ times the wavelength of the high-frequency signal, or are, for example, ⅛ to ¹⁄₁₆ times the wavelength of the high-frequency signal. The dimensions of a mesh 26b in the X direction and the Y direction in the second region 25 are Mx2 and My2, respectively. The dimensions Mx2 and My2 are, for example, 2 to 32 times the dimensions Mx1 and My1, respectively, or 8 to 16 times the dimensions Mx1 and My1, respectively.

The dimension of the mesh 26a in the Z direction of each of the dielectric layers 16 and 18 in the first region 24 is Mz1, and the dimension of the mesh 26a in the Z direction of the conductor pattern 10 in the first region 24 is Mz1a. The dimensions of the mesh 26b in the Z direction of each of the dielectric layers 16 and 18 in the second region 25 is Mz2, and the dimension of the mesh 26b in the Z direction of the conductor pattern 10 in the second region 25 is Mz2a. Since the electric field is not generated in the conductor layer 14, the meshes 26a and 26b are not generated in the conductor layer 14. The dimensions Mz2 and Mz2a are, for example, 2 to 32 times the dimensions Mz1 and Mz1a, respectively, or 8 to 16 times the dimensions Mz1 and Mz1a, respectively. The meshes 26a and 26b may be triangular. In the finite element method, numerical values of electric fields and the like in grids 27a and 27b are calculated.

In the finite element method, meshes are generated in the dielectric layers 16 and 18 in addition to the conductor pattern 10. Therefore, the load of the electromagnetic field analysis is heavy. Further, in the finite element method, since the meshes 26b are also formed in the second region 25, the load of the electromagnetic field analysis increases. Therefore, when the electromagnetic field analysis is performed using the finite element method, in step S16, the computer 30 forms the meshes 26a (first meshes) having dimensions Mx1, My1, Mz1, and Mz1a in the conductor pattern 10 and the dielectric layers 16 and 18 in the first region 24. In step S18, the computer 30 generates the meshes 26b (second meshes) having dimensions Mx2, My2, Mz2, and Mz2a in the conductor pattern 10 and the dielectric layers 16 and 18 in the second region 25. The dimensions Mx2, My2, Mz2 and Mz2a are greater than the dimensions Mx1, My1, Mz1 and Mz1a, respectively. As a result, the number of generated meshes is reduced, and the load of the electromagnetic field analysis can be reduced. At least one of the dimensions Mx2, My2, Mz2, and Mz2a is greater than the corresponding one of the dimensions Mx1, My1, Mz1, and Mz1a. The number of meshes in the X and Y directions is greater than that in the Z direction. Therefore, the number of the meshes 26 can be further reduced by making the dimensions Mx2 and My2 larger than the dimensions Mx1 and My1, respectively.

[Examples of Distributor and Combiner]

Figure 11:
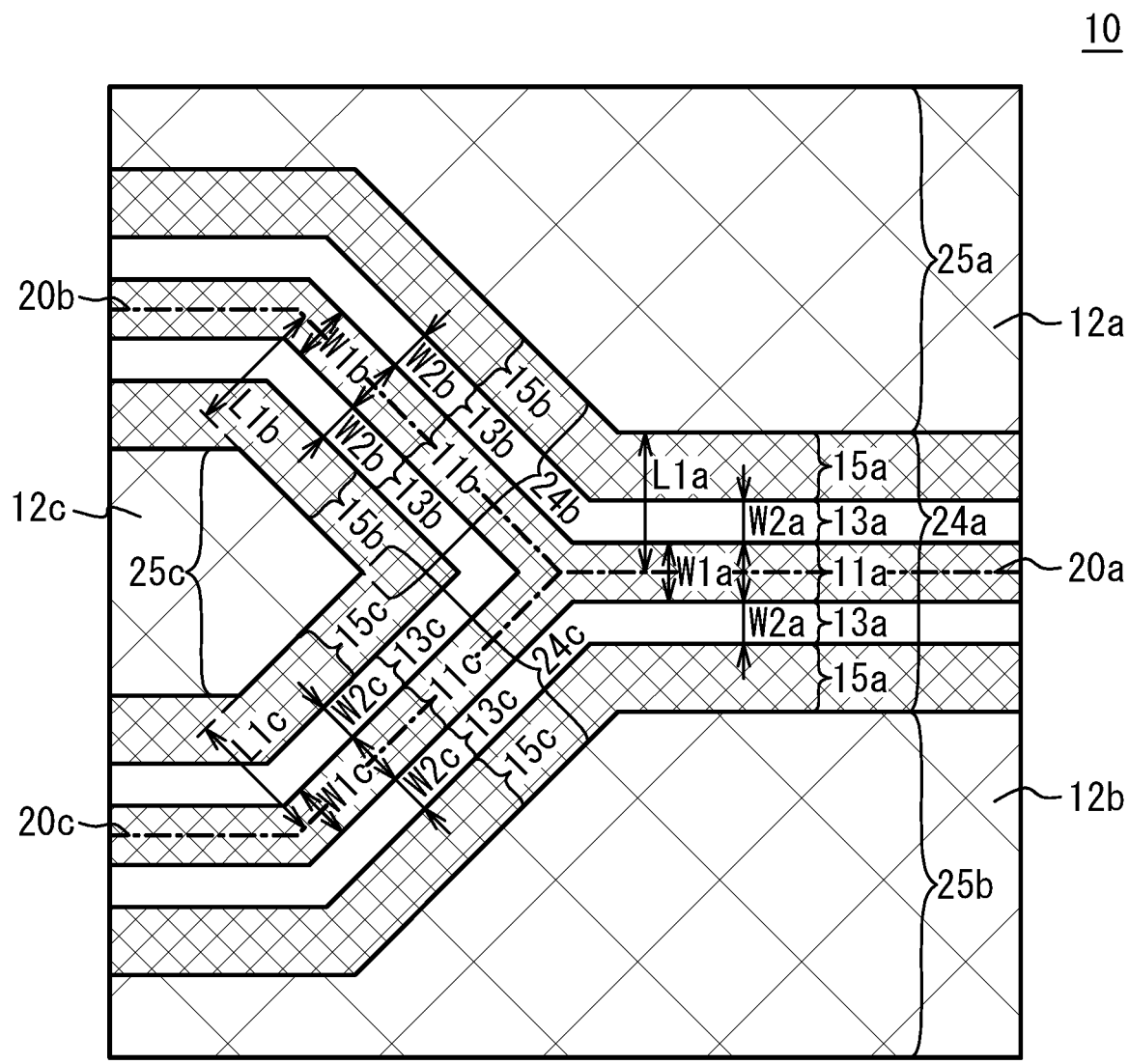
FIG. 11 is a plan view illustrating a first region and a second region in a distributor or a combiner.

A distributor or combiner in which the conductor pattern 10 is formed so that two signal lines are coupled to one signal line will be described. FIG. 11 is a plan view illustrating the first region and the second region in the distributor or the combiner. In FIG. 11, the meshes 26 and the grids 27 are not illustrated. As illustrated in FIG. 11, two signal lines 11b and 11c are coupled to form one signal line 11a. That is, the signal lines 11a, 11b, and 11c are connected at one point. Reference potential patterns 12a and 12b sandwich the signal line 11a therebetween. Gap regions 13a are provided between the reference potential pattern 12a and the signal line 11a and between the reference potential pattern 12b and the signal line 11a. The widths of the signal line 11a and the gap region 13a in the direction orthogonal to the extending direction of the signal line 11a are represented by W1a and W2a, respectively. A region within a distance L1a from a center line 20a of the signal line 11a is a region 24a. The reference potential patterns 12a and 12b in the region 24a are regions 15a. Regions outside the region 24a are regions 25a and 25b.

The reference potential patterns 12a and 12b sandwich the signal line 11b therebetween, and gap regions 13b are provided between the reference potential pattern 12a and the signal line 11b and between the reference potential pattern 12c and the signal line 11b, respectively. The widths of the signal line 11b and the gap region 13b in the direction orthogonal to the extending direction of the signal line 11b are represented by W1b and W2b, respectively. A region within a distance L1b from a center line 20b of the signal line 11b is a region 24b. The reference potential patterns 12a and 12c in the region 24b are regions 15b. Regions outside the region 24b are regions 25a and 25c. The reference potential patterns 12b and 12c sandwich the signal line 11c therebetween, and gap regions 13c are provided between the reference potential pattern 12b and the signal line 11c and between the reference potential pattern 12c and the signal line 11c, respectively. The widths of the signal line 11c and the gap region 13c in the direction orthogonal to the extending direction of the signal line 11c are represented by W1c and W2c, respectively. A region within a distance L1c from a center line 20c of the signal line 11c is a region 24c. The reference potential patterns 12b and 12c in the region 24c are regions 15c. Regions outside the region 24c are the regions 25b and 25c.

The widths W1a, W1b, and W1c may be the same as or different from each other. The widths W2a, W2b, and W2c may be the same as or different from each other. By adjusting the widths W1a to W1c of the signal lines 11a to 11c to be different from each other or by adjusting the widths W2a to W2c of the gap regions 13a to 13c to be different from each other, it is possible to make the characteristic impedances of the transmission lines including the signal lines 11a to 11c different from each other. The distances L1a to L1c may be the same as or different from each other. For example, in the case that L1a=A×W1a+B×W2a, L1b=A×W1b+B×W2b, and L1c=A×W1c+B×W2c, when the widths W1a to W1c are different from each other, or when the widths W2a to W2c are different from each other, the distances L1a to L1c are different from each other.

In step S16 of FIG. 4, the processor 32 generates the meshes 26 and the grids 27 in the conductor pattern 10 in the regions 24a to 24c. In step S18 of FIG. 4, the processor 32 generates the meshes 26 and the grids 27 in the conductor pattern 10 in the regions 25a to 25c using a condition different from that in step S16.

Figure 12:
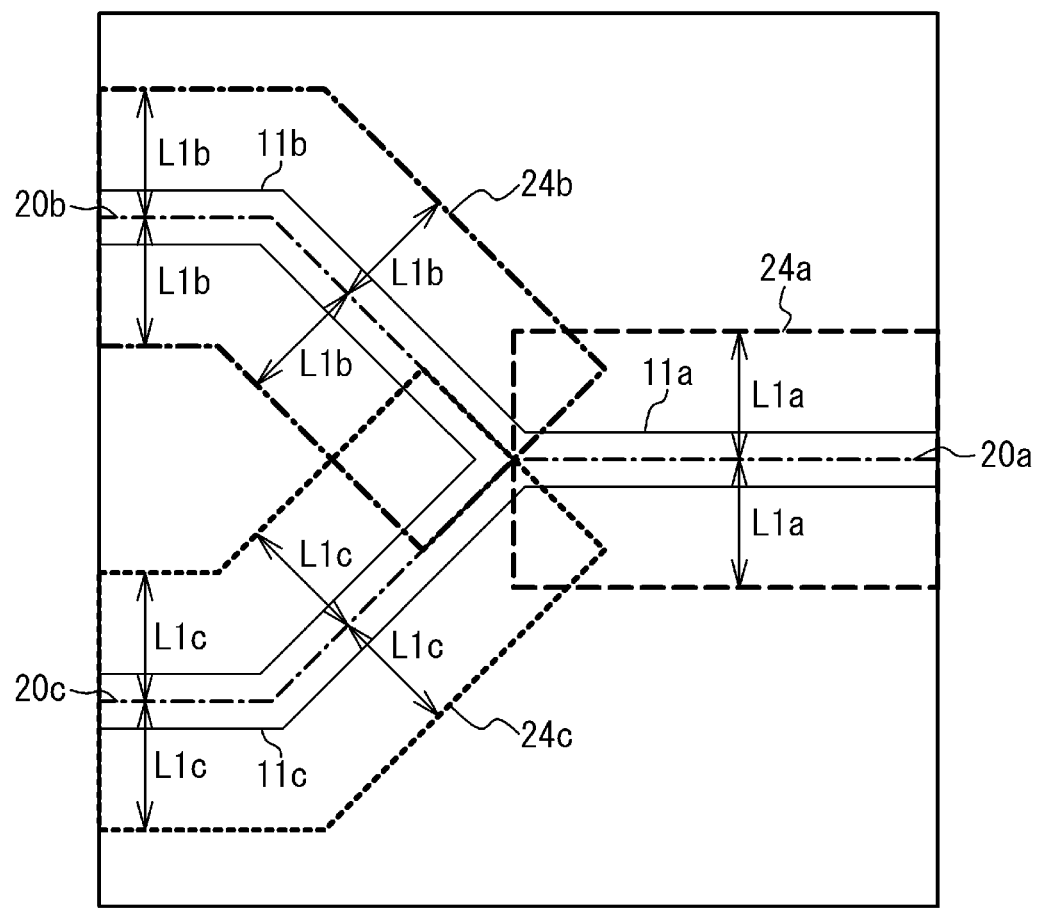
FIG. 12 is a diagram illustrating a method of generating the first region in FIG. 11.

A method of setting the first region 24 and the second region 25 by the processor 32 in step S14 of FIG. 4 will be described with respect to the pattern of FIG. 11. FIG. 12 is a diagram illustrating a method of generating the first region 24 in FIG. 11. In FIG. 12, the signal lines 11a to 11c, the center lines 20a to 20c, and the regions 24a to 24c are illustrated. As illustrated in FIG. 12, the computer 30 sets a region within the distance L1a from the center line 20a in a direction orthogonal to the extending direction of the center line 20a as the region 24a. Similarly, the computer 30 sets a region within the distance L1b from the center line 20b in a direction orthogonal to the extending direction of the center line 20b and a region within the distance L1c from the center line 20c in a direction orthogonal to the extending direction of the center line 20c as the regions 24b and 24c, respectively. The processor 32 sets a region obtained by combining the regions 24a to 24c (that is, a region obtained by performing an AND process on the regions 24a to 24c) as the first region 24. The processor 32 sets a region other than the first region 24 as the second region 25.

In step S14 of FIG. 4, as illustrated in FIG. 12, the computer 30 sets a region within a first distance L1a from the center line 20a (first center line) of the signal line 11a (first signal line) in a first direction orthogonal to the extending direction of the center line 20a as the region 24a. The computer 30 sets a region within a second distance L1b from the center line 20b (second center line) of the signal line 11b (second signal line) in a second direction orthogonal to the extending direction of the center line 20 as the region 24b. The computer 30 sets a region within a third distance L1c from the center line 20c (third center line) of the signal line 11c (third signal line) in a third direction orthogonal to the extending direction of the center line 20c as the region 24c. The computer 30 sets a region where the regions 24a, 24b, and 24c overlap each other as the first region 24. Here, L1a=A×W1a+B×W2a, L1b=A×W1b+B×W2b, and L1c=A×W1c+B×W2c. Here, A is a constant common to the distances L1a, L1b and L1c, and B is a constant common to the distances L1a, L1b and L1c. Thus, the first region 24 can be set even when the widths W1a, W1b, and W1c are different from each other and the widths W2a, W2b, and W2c are different from each other. Although the case of three signal lines 11a to 11c has been described as an example, the number of signal lines may be two or four or more. A is, for example, 0.5 or greater and 2.5 or less, or 1 or greater and 2 or less, and is, for example, 1.5. B is, for example, 1 or greater and 5 or less, or 2 or greater and 4 or less, and is 3 as an example.

[Example 1 of a Stub]

Figure 13:
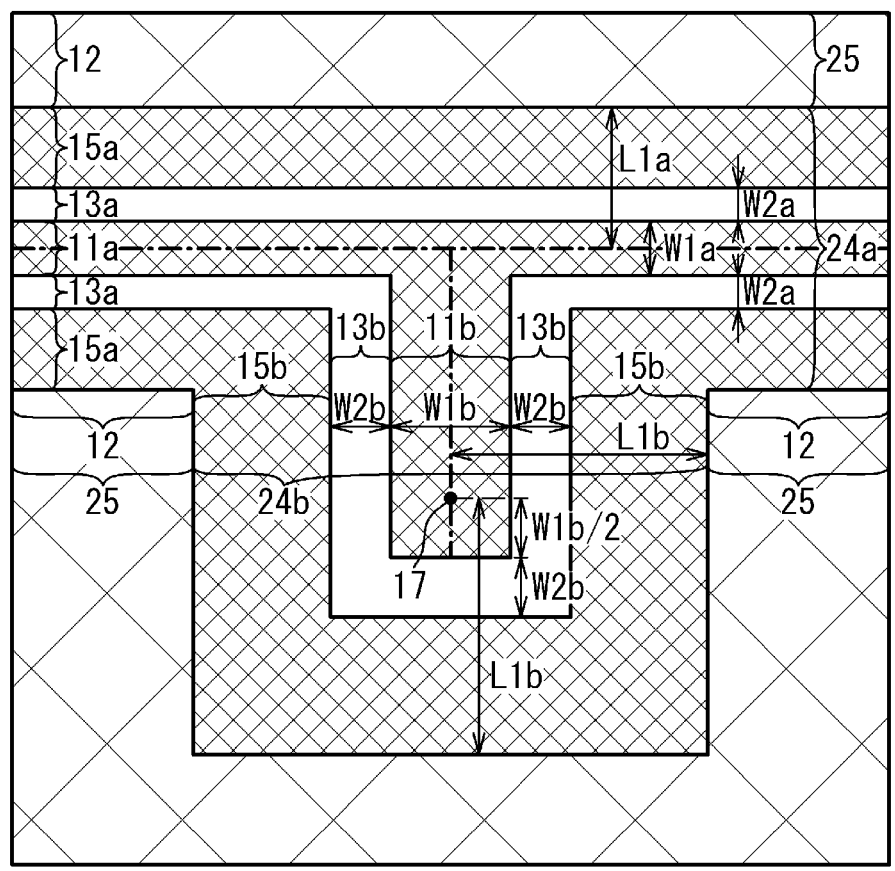
FIG. 13 is a plan view illustrating the first region and the second region in a signal line and a stub.

A case where the conductor pattern 10 includes a signal line and a stub will be described. FIG. 13 is a plan view illustrating the first region and the second region in the signal line and the stub. As illustrated in FIG. 13, the signal line 11b as an open stub is coupled to the signal line 11a. A first end of the signal line 11b is connected to the signal line 11a, and a second end of the signal line 11b is open. The gap regions 13a sandwich the signal line 11a therebetween, and the gap regions 13b sandwich the signal line 11b therebetween. The reference potential patterns 12 are provided further out than the gap regions 13a and 13b.

The widths of the signal line 11a and the gap region 13a in the direction orthogonal to the extending direction of the signal line 11a are W1a and W2a, respectively. A region within the distance L1a from the center line 20a of the signal line 11a is the region 24a. The conductor pattern 10 in the region 24a is the region 15a. The widths of the signal line 11b and the gap region 13b in the direction orthogonal to the extending direction of the signal line 11b are W1b and W2b, respectively. A region within the distance L1b from the center line 20b of the signal line 11b is the region 24b. The conductor pattern 10 in the region 24b is the region 15b. At the second end of the signal line 11b, a point at W1b/2 from the second end of the signal line 11b is set as a reference point 17, and a region within the distance L1b from the reference point 17 in the extending direction of the signal line 11b is the region 24b.

When the characteristic impedance of the open stub including the signal line 11b is different from the characteristic impedance of the transmission line including the signal line 11a, the widths W1a and W1b are different from each other, and the widths W2a and W2b are different from each other.

Figure 14:
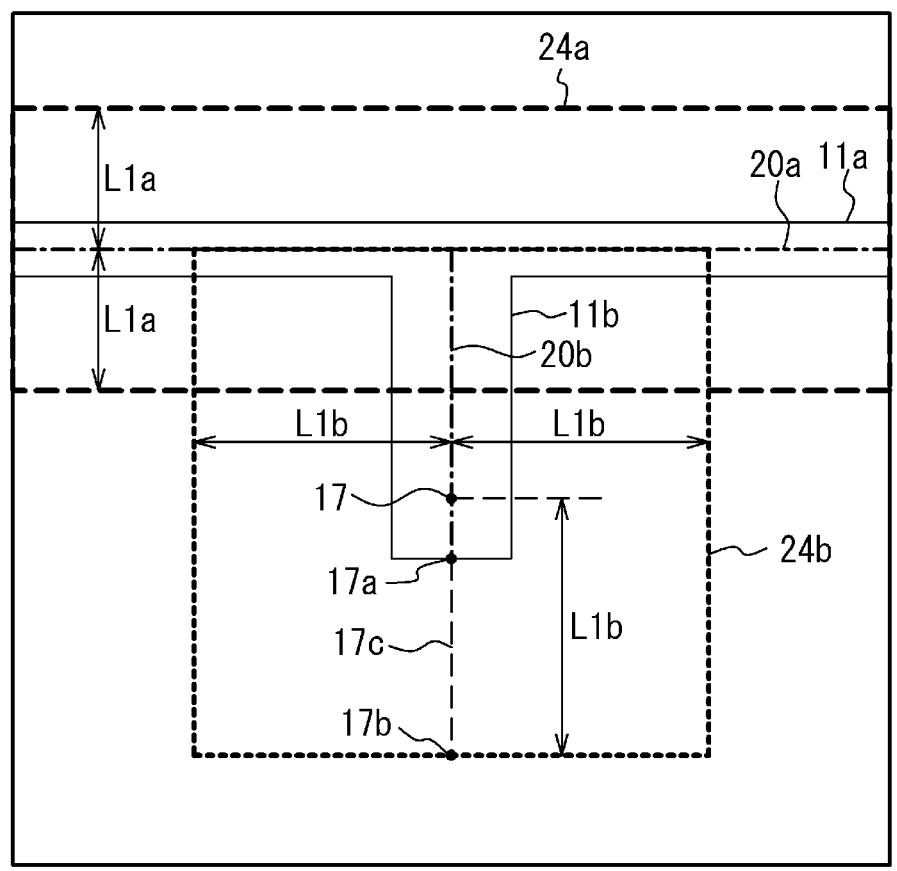
FIG. 14 is a diagram illustrating a method of generating the first region in FIG. 13.

The method in which the processor 32 sets the regions 24 and 25 in step S14 of FIG. 4 will now be described for the pattern of FIG. 13. FIG. 14 is a diagram illustrating a method of generating the first region 24 in FIG. 13. FIG. 14 illustrates the signal lines 11a and 11b, the center lines 20a and 20b, and the regions 24a and 24b. As illustrated in FIG. 14, the processor 32 sets a region within the distance L1a from the center line 20a in a direction orthogonal to the extending direction of the center line 20a as the region 24a. The processor 32 sets, as the reference point 17, a point on the center line 20b of the signal line 11b that is located on the inner side of an end 17a of the center line 20b by W1b/2. The processor 32 extends a line 17c from the end 17a of the center line 20b to a point 17b in the extending direction of the center line 20b. The distance between the reference point 17 and the point 17b is L1b. The processor 32 sets a region within the distance L1b from the center line 20b and the line 17c in a direction orthogonal to the extending direction of the center line 20b as the region 24b. The processor 32 sets a region obtained by combining the regions 24a and 24b (that is, a region obtained by performing an AND process on the regions 24a and 24b) as the first region 24. The processor 32 sets a region other than the first region 24 as the second region 25.

[Example 2 of a Stub]

Figure 15:
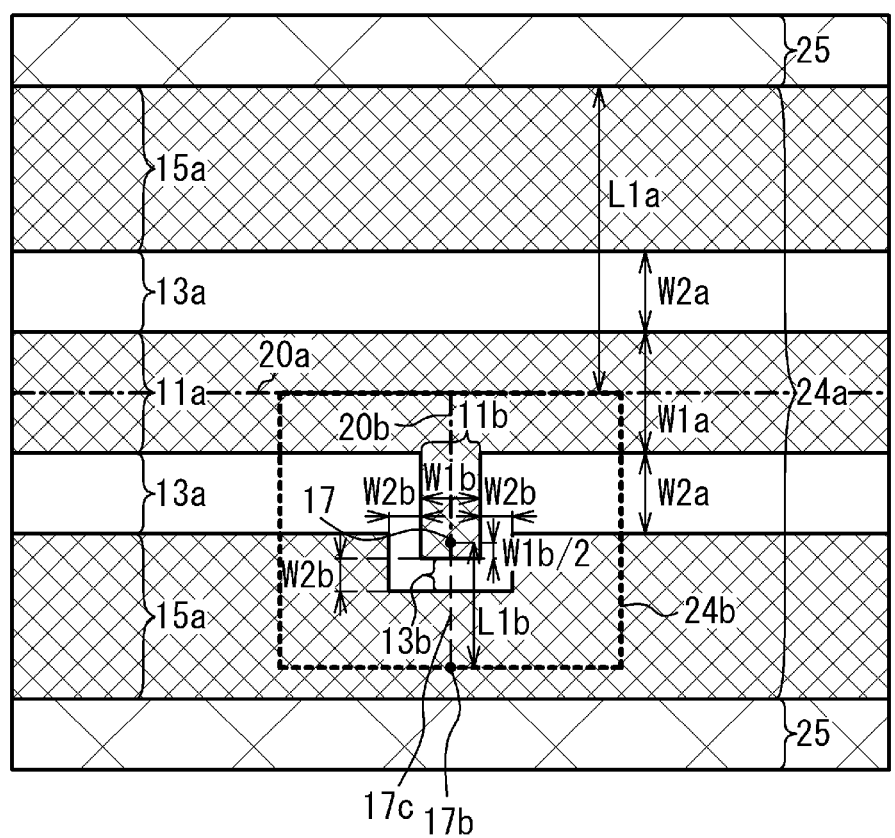
FIG. 15 is a plan view illustrating the first region and the second region in a signal line and a stub.

FIG. 15 is a plan view illustrating the first region and the second region in a signal line and a stub. As illustrated in FIG. 15, the width W1a of the signal line 11a and the width W2a of the gap region 13a are larger than the widths W1a and W2a in FIG. 13, respectively. The width W1b of the signal line 11b and the width W2b of the gap region 13b are smaller than the widths W1b and W2b in FIG. 13, respectively. The point 17b at a distance L1b from the reference point 17 in the extending direction of the center line 20b is located within the region 24a. Therefore, the region 24b is entirely included in the region 24a, and the first region 24 coincides with the region 24a. As clear from above, when the region 24b is completely included in the region 24a, the first region 24 coincides with the region 24a.

In the examples of FIG. 12 to FIG. 15, the signal line 11a (first signal line) and the signal line 11a (second signal line) having a first end connected to the signal line 11b and a second end that is open are provided. In such a case, in step S14 of FIG. 4, as illustrated in FIG. 14, the computer 30 sets a region within a first distance L1a from the center line 20a (first center line) of the signal line 11a in a first direction orthogonal to the extending direction of the center line 20a as the region 24a. The computer 30 sets a region within a third distance L1b from a line (the center line 20b+the line 17c), which is obtained by extending the center line 20b (second center line) of the signal line 11b by a second distance (L1b−W1b/2) from the second end 17a of the signal line 11b, in a second direction orthogonal to the extending direction of the line (the center line 20b+the line 17c) as the region 24b. The computer 30 sets a region where the regions 24a and 24b overlap each other as the first region 24. Here, the first distance L1a is A×W1a+B×W2a, the second distance (L1b−W1b/2) is A×W1b+B×W2b−W1b/2, and the third distance L1b is A×W1b+B×W2b. Thus, the first region 24 can be set even in the open stub. A is, for example, 0.5 or greater and 2.5 or less, or 1 or greater and 2 or less, and is, for example, 1.5. B is, for example, 1 or greater and 5 or less, or 2 or greater and 4 or less, and is 3 as an example.

The processor may be any of various processors suitable for control of a computer, such as a CPU, a graphics processing unit (GPU), a digital signal processor (DSP), a field programmable gate array (FPGA), and an application specification integrated circuit (ASIC). Note that a plurality of the above processors physically separated from each other may cooperate with each other to execute the above processes. For example, the processors respectively mounted on a plurality of physically separated computers may cooperate with each other via a network such as a local area network (LAN), a wide area network (WAN), or the Internet to execute the above processes.

The above program may be installed in the memory from an external server device or the like via the network, or may be distributed in a state of being stored in a storage medium such as a CD-ROM, a DVD-ROM, or a semiconductor memory, and installed in the memory from the storage medium.

Note that the embodiments disclosed herein are illustrative in all respects and are not restrictive. The scope of the present disclosure is defined not by the above-described meaning but by the claims, and is intended to include all modifications within the meaning and scope equivalent to the claims.

What is claimed is:

1. An electromagnetic field analysis method comprising:
generating meshes so that a first mesh is generated in a first region and no mesh or a second mesh is generated in a second region other than the first region in a coplanar waveguide, the coplanar waveguide including a dielectric layer and a conductor pattern having a signal line and reference potential patterns, the first region including the signal line and respective parts of the reference potential patterns and having a constant width in a direction orthogonal to an extending direction of the signal line, the reference potential patterns being spaced away from the signal line and interposing the signal line therebetween, the second mesh having a larger dimension than the first mesh; and
performing electromagnetic field analysis on the coplanar waveguide using the meshes.

2. The electromagnetic field analysis method according to claim 1,
wherein the generating of the meshes includes generating the first mesh on a surface of the conductor pattern in the first region and generating no mesh in the second region, and
wherein the performing of the electromagnetic field analysis includes performing the electromagnetic field analysis using a boundary element method.

3. The electromagnetic field analysis method according to claim 2, wherein the generating of the meshes includes generating no mesh in the dielectric layer.

4. The electromagnetic field analysis method according to claim 1,
wherein the first region includes a first portion of the conductor pattern and a first portion of the dielectric layer located in the first region,
wherein the second region includes a second portion of the conductor pattern and a second portion of the dielectric layer located in the second region, and
wherein the performing of the electromagnetic field analysis includes performing the electromagnetic field analysis using a finite element method.

5. The electromagnetic field analysis method according to claim 1, wherein the generating of the meshes includes setting a region within a certain distance from a center line of the signal line in a direction orthogonal to an extending direction of the center line as the first region, and setting a region away from the center line by a distance greater than the certain distance in the direction orthogonal to the center line as the second region.

6. The electromagnetic field analysis method according to claim 5, wherein the constant distance is A×W1+B×W2, where W1 is a width of the signal line in the direction orthogonal to the extending direction, W2 is a distance between the signal line and each of the reference potential patterns in the direction orthogonal to the extending direction, A is a constant, and B is a constant.

7. The electromagnetic field analysis method according to claim 6, wherein A is a constant of 0.5 or greater and 2.5 or less, and B is a constant of 1 or greater and 5 or less.

8. The electromagnetic field analysis method according to claim 1,
wherein the signal line includes a first signal line, a second signal line, and a third signal line connected to each other at one point,
wherein the generating of the meshes includes setting, as the first region, a region where a region within a first distance from a first center line of the first signal line in a first direction orthogonal to an extending direction of the first center line, a region within a second distance from a second center line of the second signal line in a second direction orthogonal to an extending direction of the second center line, and a region within a third distance from a third center line of the third signal line in a third direction orthogonal to an extending direction of the third center line overlap each other, wherein the first distance is A×W1a+B×W2a,
the second distance is A×W1b+B×W2b, and
the third distance is A×W1c+B×W2c where W1a represents a width of the first signal line in the first direction, W2a represents a distance between the first signal line and each of first patterns of the reference potential patterns in the first direction, W1b represents a width of the second signal line in the second direction, W2b represents a distance between the second signal line and each of second patterns of the reference potential patterns in the second direction, W1c represents a width of the third signal line in the third direction, W2c represents a distance between the third signal line and each of third patterns of the reference potential pattern in the third direction, A is a constant, and B is constant.

9. The electromagnetic field analysis method according to claim 1, wherein the signal line includes a first signal line and a second signal line, the second signal line having a first end connected to the first signal line and a second end that is open, wherein the generating of the meshes includes setting, as the first region, a region where a region within a first distance from a first center line of the first signal line in a first direction orthogonal to an extending direction of the first center line and a region within a third distance from a line in a second direction orthogonal to an extending direction of the line overlap each other, the line being obtained by extending a second center line of the second signal line from the second end of the second signal line by a second distance, and wherein the first distance is A×Wa+B×W2a,
the second distance is A×W1b+B×W2b−W1b/2, and
the third distance is A×W1b+B×W2b where W1a represents a width of the first signal line in the first direction, W2a represents a distance between the first signal line and each of first patterns of the reference potential patterns in the first direction, W1b represents a width of the second signal line in the second direction, W2b represents a distance between the second signal line and each of second patterns of the reference potential patterns in the second direction, A is a constant, and B is a constant.

10. An electromagnetic field analysis apparatus comprising:

a processor configured to:

generate meshes so that a first mesh is generated in a first region and no mesh or a second mesh is generated in a second region other than the first region in a coplanar waveguide, the coplanar waveguide including a dielectric layer and a conductor pattern having a signal line and reference potential patterns, the first region including the signal line and respective parts of the reference potential patterns and having a constant width in a direction orthogonal to an extending direction of the signal line, the reference potential patterns being spaced away from the signal line and interposing the signal line therebetween, the second mesh having a larger dimension than the first mesh; and perform electromagnetic field analysis on the coplanar waveguide using the meshes.

11. The electromagnetic field analysis apparatus according to claim 10, wherein the processor is configured to:

generate the first mesh on a surface of the conductor pattern in the first region and generate no mesh in the second region when generating meshes, and perform the electromagnetic field analysis using a boundary element method when performing the electromagnetic field analysis.

12. The electromagnetic field analysis apparatus according to claim 11, wherein the processor is configured to generate no mesh in the dielectric layer when generating the meshes.

13. The electromagnetic field analysis apparatus according to claim 10, wherein the first region includes a first portion of the conductor pattern and a first portion of the dielectric layer located in the first region, wherein the second region includes a second portion of the conductor pattern and a second portion of the dielectric layer located in the second region and wherein the processor is further configured to perform the electromagnetic field analysis using a finite element method when performing the electromagnetic field analysis.

14. The electromagnetic field analysis apparatus according to claim 10, wherein the processor is configured to set a region within a certain distance from a center line of the signal line in a direction orthogonal to an extending direction of the center line as the first region, and set a region away from the center line by a distance greater than the certain distance in the direction orthogonal to the center line as the second region when generating the meshes.

15. The electromagnetic field analysis apparatus according to claim 14, wherein the certain distance is A×W1+B×W2, where W1 is a width of the signal line in the direction orthogonal to the extending direction, W2 is a distance between the signal line and each of the reference potential patterns in the direction orthogonal to the extending direction, A is a constant, and B is a constant.

16. The electromagnetic field analysis apparatus according to claim 15, wherein A is a constant of 0.5 or greater and 2.5 or less, and B is a constant of 1 or greater and 5 or less.

17. The electromagnetic field analysis apparatus according to claim 10, wherein the signal line includes a first signal line, a second signal line, and a third signal line connected to each other at one point, wherein the processor is configured to set, as the first region, a region where a region within a first distance from a first center line of the first signal line in a first direction orthogonal to an extending direction of the first center line, a region within a second distance from a second center line of the second signal line in a second direction orthogonal to an extending direction of the second center line, and a region within a third distance from a third center line of the third signal line in a third direction orthogonal to an extending direction of the third center line overlap each other when generating the meshes, and wherein the first distance is A×W1a+B×W2a,
the second distance is A×W1b+B×W2b, and
the third distance is A×W1c+B×W2c where W1a represents a width of the first signal line in the first direction, W2a represents a distance between the first signal line and each of first patterns of the reference potential patterns in the first direction, W1b represents a width of the second signal line in the second direction, W2b represents a distance between the second signal line and each of second patterns of the reference potential patterns in the second direction, W1c represents a width of the third signal line in the third direction, W2c represents a distance between the third signal line and each of third patterns of the reference potential patterns in the third direction, A is a constant, and B is constant.

18. The electromagnetic field analysis apparatus according to claim 10,
wherein the signal line includes a first signal line and a second signal line, the second signal line having a first end connected to the first signal line and a second end that is open,
wherein the processor is configured to set, as the first region, a region where a region within a first distance from a first center line of the first signal line in a first direction orthogonal to an extending direction of the first center line and a region within a third distance from a line in a second direction orthogonal to an extending direction of the line overlap each other when generating the meshes, the line being obtained by extending a second center line of the second signal line from the second end of the second signal line by a second distance, and
wherein the first distance is $A \times W1a + B \times W2a$,
the second distance is $A \times W1b + B \times W2b - W1b/2$, and
the third distance is $A \times W1b + B \times W2b$
where W1a represents a width of the first signal line in the first direction, W2a represents a distance between the first signal line and each of first patterns of the reference potential patterns in the first direction, W1b represents a width of the second signal line in the second direction, W2b represents a distance between the second signal line and each of second patterns of the reference potential patterns in the second direction, A is a constant, and B is a constant.

19. A non-transitory computer-readable storage medium storing an electromagnetic field analysis program that causes a computer to execute a process: the process comprising:
generating meshes so that a first mesh is generated in a first region and no mesh or a second mesh is generated in a second region other than the first region in a coplanar waveguide, the coplanar waveguide including a dielectric layer and a conductor pattern having a signal line and reference potential patterns, the first region including the signal line and respective parts of the reference potential patterns and having a constant width in a direction orthogonal to an extending direction of the signal line, the reference potential patterns being spaced away from the signal line and interposing the signal line therebetween, the second mesh having a larger dimension than the first mesh; and
performing electromagnetic field analysis on the coplanar waveguide using the meshes.

* * * * *